(12) United States Patent
Park et al.

(10) Patent No.: US 11,616,391 B2
(45) Date of Patent: Mar. 28, 2023

(54) ENERGY MANAGEMENT DEVICE AND OPERATION METHOD THEREFOR

(71) Applicant: LG ELECTRONICS INC., Seoul (KR)

(72) Inventors: Wookjin Park, Seoul (KR); Haengwoon Kim, Seoul (KR); Eunjung Suh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 477 days.

(21) Appl. No.: 16/479,897

(22) PCT Filed: Jan. 16, 2018

(86) PCT No.: PCT/KR2018/000762
§ 371 (c)(1),
(2) Date: Jul. 22, 2019

(87) PCT Pub. No.: WO2018/139797
PCT Pub. Date: Aug. 2, 2018

(65) Prior Publication Data
US 2019/0393724 A1    Dec. 26, 2019

(30) Foreign Application Priority Data

Jan. 26, 2017    (KR) .................. 10-2017-0012892

(51) Int. Cl.
*G05B 13/02*    (2006.01)
*G05F 1/66*    (2006.01)
(Continued)

(52) U.S. Cl.
CPC .......... *H02J 13/0062* (2013.01); *G05B 13/02* (2013.01); *G05F 1/66* (2013.01); *G06Q 50/06* (2013.01); *H02J 3/14* (2013.01)

(58) Field of Classification Search
CPC ........ F03D 17/00; G05F 1/66; H02J 13/0062; H02J 3/14; G06Q 50/06
See application file for complete search history.

(56) References Cited

U.S. PATENT DOCUMENTS 10,809,286 B2 *   10/2020   Micali ................. G05F 1/66
2013/0268196 A1 *  10/2013   Dam .................. G06Q 50/06
                                                 702/3

(Continued)

FOREIGN PATENT DOCUMENTS

EP    3029805 A1    6/2016
JP    2004-013197 A 1/2004
(Continued)

*Primary Examiner* — Eman A Alkafawi
(74) *Attorney, Agent, or Firm* — Dentons US LLP

(57) ABSTRACT

An energy management device according to an embodiment of the present invention comprises: a communication unit for receiving energy information of a system to which the energy management device belongs; a display unit for displaying any one energy information icon on the basis of the received energy information; and a control unit for displaying at least one energy information icon corresponding to a lower level of the energy information icon upon receiving a command to select an expansion icon corresponding to the energy information icon, and connecting the energy information icon having the selected expansion icon and the energy information icon corresponding to the lower level to energy nodes having different thickness according to the amount of energy.

12 Claims, 12 Drawing Sheets

(51) Int. Cl.
*G06Q 50/06* (2012.01)
*H02J 3/14* (2006.01)
*H02J 13/00* (2006.01)

(56) References Cited

U.S. PATENT DOCUMENTS

2015/0207320 A1* 7/2015 Kashiwagi ............. G05B 15/02
　　　　　　　　　　　　　　　　　　　　700/286
2017/0363666 A1* 12/2017 Alkuran ............ H02J 13/00017

FOREIGN PATENT DOCUMENTS

| JP | 2007-199783 A | 8/2007 |
| JP | 2011-248568 A | 12/2011 |
| JP | 2014-215701 A | 11/2014 |
| JP | 2017-215701 A | 12/2017 |
| KR | 10-2013-0005968 A | 1/2013 |
| KR | 10-1447635 B1 | 10/2014 |

* cited by examiner

ENERGY MANAGEMENT DEVICE AND OPERATION METHOD THEREFOR

This application is a National Stage Application of International Application No. PCT/KR2018/000762 filed on Jan. 16, 2018, which claims benefit of and priority to Korean Patent Application No. 10-2017-0012892 filed on Jan. 26, 2017, all of which are hereby incorporated by reference in their entirety for all purposes as if fully set forth herein.

TECHNICAL FIELD

The present invention relates to an energy management device and a method of operating the same and, more particularly, to an energy management device for managing a smart grid and a method of operating the same.

BACKGROUND ART

Currently, a power system (power grid) for supplying power to home or offices is managed by a vertical centralized network controlled by a producer. That is, the power system has a radial structure spreading from a center to the periphery to distribute energy from an energy supplier to a plurality of places of use and is centered on a one-way supplier, not on consumers. Therefore, the supplier simply supplied an energy source such as electricity, water, gas, etc. and consumers simply used the received energy source. Accordingly, it is difficult to efficiently manage energy generation, distribution or use.

In addition, the price information of electricity is not checked in real time, but is only checked through a power exchange. In addition, since a substantially fixed price system is used, incentives for consumers through price change cannot be used.

In such a power system, it is impossible to solve a global problem such as global warming prevention, absence of a method of coping with increase in price of raw materials of energy, an energy overconsumption suppression problem, and a stable power supply problem.

Accordingly, in order to emerge from a current power system and improve efficiency of the electricity industry through establishment of a bidirectional information transmission system between a consumer and a supplier, it is necessary to develop a smart grid. Further, it is necessary to establish a smart grid for enabling consumers to control their power demands and to develop an energy management device capable of performing bidirectional communication with such a smart grid.

DISCLOSURE

Technical Problem

An object of the present invention devised to solve the problem lies in a method of allowing a user to easily grasp energy movement information in a system.

Another object of the present invention devised to solve the problem lies in a method of allowing a user to easily grasp past energy data of each component configuring a system and movement information of past energy.

Another object of the present invention devised to solve the problem lies in a method of allowing a user to easily grasp a place where an energy problem has occurred in a system.

Technical Solution

An energy management device according to an embodiment of the present invention can indicate energy movement information through a structure expanding from a highest level to a lowest level, by dividing total energy supplied to or consumed in a system step by step. More specifically, an energy management device according to an embodiment of the present invention can intuitively display energy movement information using an energy node having a thickness varying according to the amount of energy.

An energy management device according to an embodiment of the present invention can display energy information of a selected component with time as a command for selecting a portion of energy movement information which is divisionally displayed.

An energy management device according to an embodiment of the present invention can simultaneously display energy movement information from a highest level to a problem occurrence position when a list of energy related problems generated in the system is displayed and a command for selecting any one from the list.

Advantageous Effects

According to various embodiments of the present invention, a user can grasp energy movement information while directly searching from a highest level to a lowest level. According to various embodiments of the present invention, it is possible to intuitively grasp an energy hierarchical structure and energy movement information in a system through a stepwise structure and an energy node having a thickness varying according to the amount of energy.

According to various embodiments of the present invention, it is possible to easily analyze current energy information and a past energy history of a specific component.

According to various embodiments of the present invention, it is possible to reduce a time required to find, analyze and solve a problem, by displaying a position where an energy related problem has occurred in a system step by step.

BEST MODE

The following merely illustrates the principles of the present invention. Therefore, those skilled in the art are able to devise various apparatuses which embody the principles of the invention and are included in the concept and scope of the invention although not explicitly described or shown herein. Furthermore, all of the conditional terms and embodiments listed herein are, in principle, only intended for the purpose of enabling understanding of the concepts of the present invention, and are not to be construed as being limited to such specifically listed embodiments and states.

It should be understood that not only the principles, aspects and embodiments of the invention but also the detailed description of specific embodiments thereof are intended to cover structural and functional equivalents thereof. It should be understood that such equivalents include equivalents to be developed in the future as well as equivalents currently known in the art, that is, all elements invented to perform the same functions irrespective of structure.

In the claims of this specification, components represented as means for performing the functions described in the detailed description are intended to encompass all methods for performing all types of software including firmware/microcode or a combination of circuit elements for performing the functions and are coupled with an appropriate circuit for executing the software in order to perform the functions. It should be understood that, since the invention defined by the appended claims has the functions provided by the various listed means in the manner required by the claims, any means capable of providing such functions is equivalent to that understood from this specification.

The above-described objects, features and advantages of the invention will be more readily apparent from consideration of the following detailed description relating to the accompanying drawings. Therefore, a person skilled in the art will readily understand the technical idea of the present invention. In the description of the drawings, the related art which renders the scope of the present invention unnecessarily ambiguous will be omitted and procedures or steps which can be understood by those skilled in the art will be omitted.

The suffixes "module" and "unit" for components used in the description below are assigned or mixed in consideration of easiness in writing the specification and do not have distinctive meanings or roles by themselves.

Hereinafter, an energy management device and a method of operating the same according to various embodiments of the present invention will be described in detail with reference to the accompanying drawings.

Figure 1:
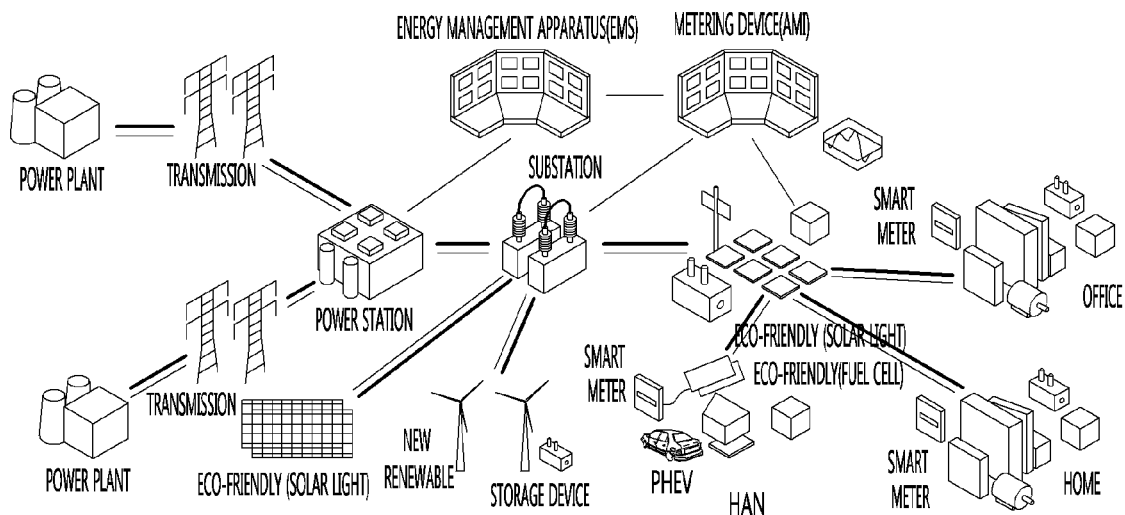
FIG. 1 is a diagram schematically showing a smart grid according to the present invention.

First, FIG. 1 is a diagram schematically showing a smart grid according to the present invention.

A smart grid is a next-generation power system capable of optimizing energy efficiency by bidirectionally exchanging real-time information between a power supplier and a consumer by combining an existing power system with information technology (IT).

The smart grid may manage an energy source such as electricity, water, gas, etc. The amount of generated or used energy source may be metered.

Accordingly, energy sources which are not described above may be included in a management object of this system. Hereinafter, electricity will be described as an energy source and the description of this specification is equally applicable to the other energy sources.

Referring to FIG. 1, the smart grid according to an embodiment includes a power plant for generating electricity. The power plant may include a power plant for generating electricity through thermal power generation or nuclear power generation and a power plant using water power, solar light or wind power as eco-friendly energy.

Electricity generated in the power plant is transmitted to a power station through a transmission line. The power station transmits electricity to a substation such that electricity is distributed to places of use such as home or offices.

In addition, electricity generated by eco-friendly energy is transmitted to a substation to be distributed to places of use. In addition, electricity transmitted by the substation is distributed to home or offices through an electricity storage device or directly.

Even in the home using a home area network (HAN), electricity is generated, stored or distributed through solar light or a fuel cell mounted in a plugin hybrid electric vehicle (PHEV) and remaining electricity may be sold to the outside (e.g., an electric power company).

In addition, the smart grid may include a smart meter for monitoring the amount of electricity used in the place of use (home or office) in real time and a metering device (an advanced metering infrastructure (AMI)) for measuring the amount of electricity used in a plurality of places of use. That is, the AMI may receive information measured by a plurality of smart meters to measure the amount of used electricity.

In this specification, metering includes metering of the smart meter and the AMI and receiving the amount of generated electricity or used electricity from another component and recognizing the amount of generated electricity or used electricity by the smart meter and the AMI.

In addition, the smart grid may further include an energy management device (energy management system (EMS)) for managing energy. The energy management device may generate information on operation of one or more components included in the smart grid in association with energy (energy generation, distribution, use, storage, etc.) In addition, the energy management device may generate a command for operating at least one component included in the smart grid.

In this specification, a function or solution performed by the energy management device may be referred to as an energy management function or an energy management solution.

In the smart grid of the present invention, one or more energy management devices may be provided as a separate configuration or may be included in one or more components as an energy management function or solution.

Figure 2:
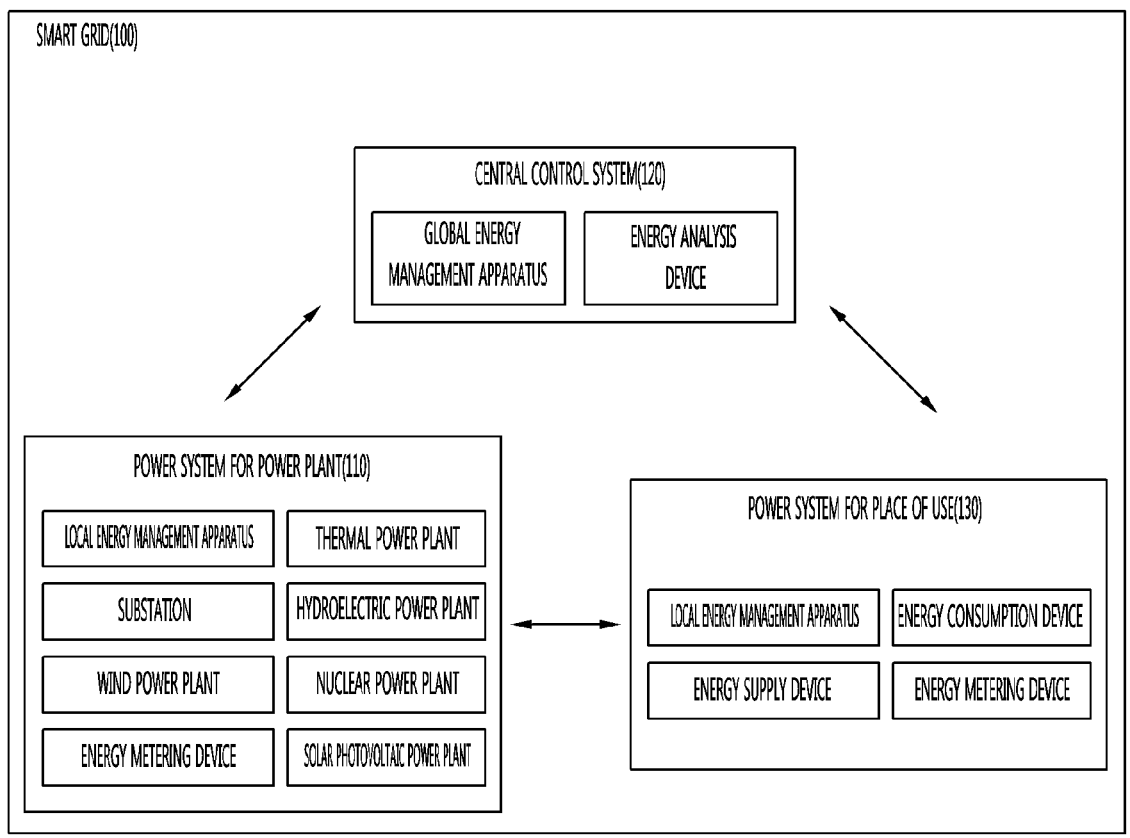
FIG. 2 is a block diagram schematically showing a smart grid according to the present invention.

FIG. 2 is a block diagram schematically showing a smart grid according to the present invention.

Referring to FIGS. 1 and 2, the smart grid 100 of the present invention includes a plurality of components. For example, a power plant, a substation, a power station, an energy management device, a home appliance, a smart meter, a capacitor, a web server, a metering device, a home server, etc. may be provided as components of the smart grid.

In addition, in the present invention, each component may include a plurality of sub-components. For example, if one component is a home appliance, a microcomputer, a heater, a display, a motor, etc. may be included as the sub-components.

That is, in the present invention, all components for performing specific functions may configure the smart grid 100. In addition, the components may communicate with each other by a communication unit.

In addition, the energy management device may be called a local energy management device or a global energy management device according to the used system. The name of the energy management device is changed according to a system in which the energy management device is used, but the function of energy management device is not changed.

Referring to FIG. 2, the smart grid 100 according to an embodiment of the present invention may include at least one power system for the power plant 110, a central control system 120 and a power system for a place of use 130.

The power system for the power plant 110 may share power information (energy information) of a plurality of power plants, and the power system for the place of use 130 may share power information of electric mechanisms in the home or power information of electric mechanisms in an office. The power system for the power plant 110 and the power system for the place of use 130 may be called a local area system.

The central control system 120 may control power information of the local area system. The global area system includes at least two local area systems and may be understood as the relative concept corresponding to the local area system.

The power system for the power plant 110 may include a power plant for generating power through thermal power generation, hydroelectric power generation or nuclear power generation and a solar photovoltaic power plant or a wind power plant using solar light or wind power as new renewable energy. Here, a unit configuring the power system for the power plant 110 such as a thermoelectric power plant or a hydroelectric power plant may be called a "power generation component".

In addition, the power system for the power plant 110 may further include a local energy management device, a substation and an energy metering device.

The local energy management device generates, distributes, uses and stores energy in the power system for the power plant 110.

Such an energy management device may be provided in each place of use or supplier and may be further provided in a local area system or global area system.

Examples of the energy management device may include an automatic temperature control device, a cable set-top box, an intelligent display device, an automatic light control device, etc. Alternatively, the energy management device may be provided in the form of a portable terminal to transmit and receive wireless signals to and from at least one of a base station, an external terminal and a server over a mobile communication network. Examples of the portable terminal may include a mobile phone, a smartphone, a laptop, a digital broadcast terminal, a personal digital assistant (PDA), a portable multimedia player (PMP), a navigation system, a wearable device, etc. In addition, short-range communication technology is applied to the portable terminal and Bluetooth, radio frequency identification (RFID), infrared data association (IrDA), ultrawideband (UWB), ZigBee, etc. may be used as the short-range communication technology.

The components included in the energy management device and the functions and roles thereof will be described below with reference to FIG. 4.

The substation receives power generated by the thermal power plant, a hydroelectric power plant or a nuclear power plant through a transmission line, converts a voltage or current, and distributes power to a place of use in a power system for the home/office. In addition, power generated by new renewable energy may be distributed into places of use through a substation.

The energy metering device measures energy generated, distributed, used or stored by each component in the power system for the power plant 110.

The central control system 120 serves to control power supply, power consumption, power distribution and managements of a local area system in the smart grid 110, and includes a global energy management device and an energy analysis (metering) device.

The global energy management device serves to control local area systems. For example, the global energy management device receives energy related information from the local energy management device in a power network 110 for the power plant and the local energy management device in the power system for the place of use 130 to enable overall energy management of the smart grid 100.

The global energy management device may predict the power of each place of use in real time through communication with the local energy management device.

The energy analysis device serves to measure, analyze and manage the energy of at least one local area system.

The power system for the place of use 130 may include a local energy management device, an energy supply device, an energy consumption device and an energy metering device.

The local energy management device controls and monitors energy generation, distribution, use, storage, etc. in the power system for the place of use 110 and a repeated description will be omitted.

Meanwhile, the power system for the place of use 130 may include the energy supply device. Specifically, the power system for the place of use 130 may generate and consume electricity even in the home through solar light or a fuel cell mounted in a plugin hybrid electric vehicle (PHEV) and supply or sell remaining electricity to another local area system.

In addition, in each local area system, the energy metering device is provided to grasp power and electric rates of the place of use in real time and the energy supply device in the local area system may recognize the amount of currently used power and the electric rates to seek for a method of reducing power consumption or electric rates according to the situation. In addition, bidirectional communication between local area systems or the components of the local area system is possible and bidirectional communication between a component in any one local area system and a component in the other local area system is also possible. Here, the component may include a power plant, an electricity company, a distributed power source, an energy management device, an energy metering device or an electric apparatus. For example, bidirectional communication between the power system for the power plant 110 and the power system for the place of use 130 is possible, and electric apparatuses in the power system for the place of use 130 is also possible. Alternatively, bidirectional communication between a power plant in the power system for the power plant 110 and the energy management device of the power system for the place of use 130 is also possible. Accordingly, adaptive electricity generation and distribution are possible, by monitoring the power consumption status of each place of use.

The energy consumption device may use energy received from the power system for the power plant 110 or the energy supply device. For example, the energy consumption device may be an electronic product provided in the home or office.

The energy metering device measures the amount of used energy from metering devices and collects and analyzes energy usage information. Examples of the metering device include electricity meters, gas meters or water meters.

The energy management device and the energy metering device allow a consumer to efficiently use electricity and provide a power supplier with an ability to detect a system problem and efficiently operate the system.

For example, the real-time price signal of the electricity market is relayed through the energy management device installed in each home and the energy management device communicates with each electric apparatus to perform control. Therefore, a user recognizes power information of each electric apparatus through the energy management device and performs power information processing such as power consumption or electric rate limit setting based on the recognized power information, thereby conserving energy and cost.

Figure 3:
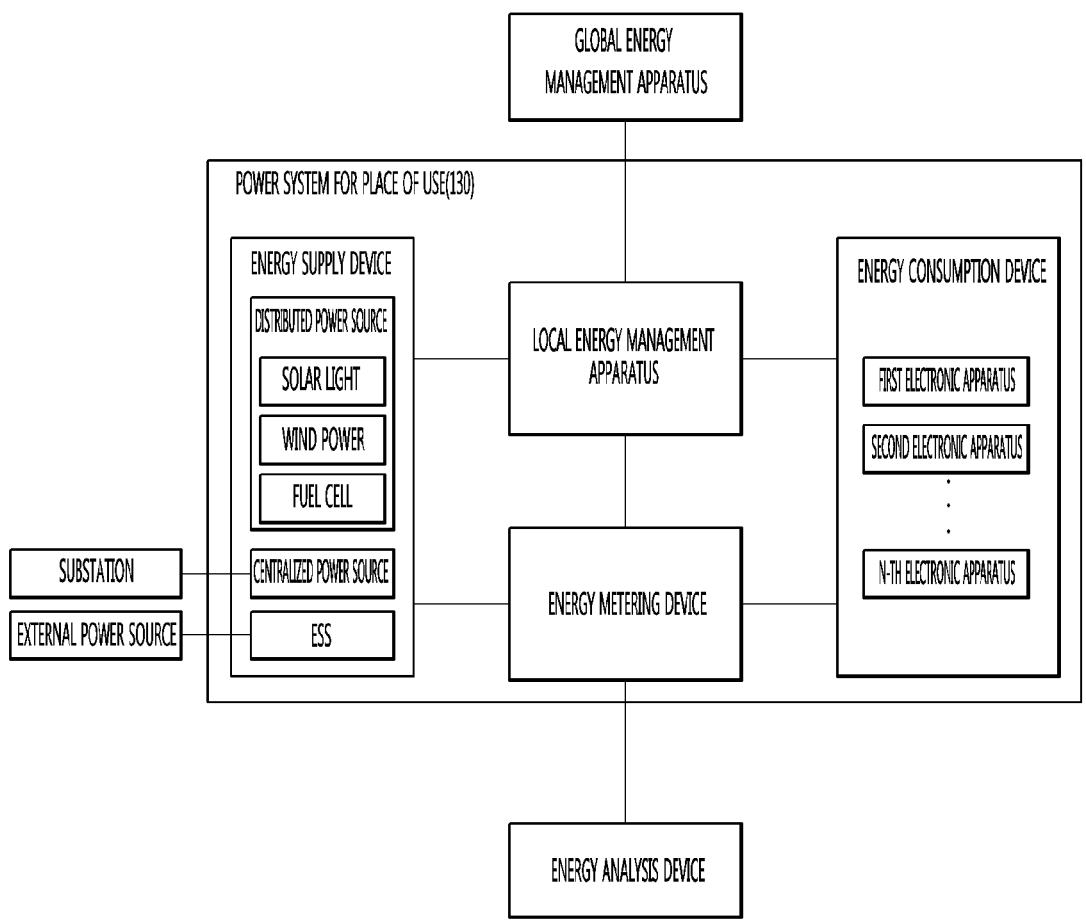
FIG. 3 is a block diagram schematically showing a power system for a place of use according to an embodiment of the present invention.

Next, FIG. 3 is a block diagram schematically showing a power system for a place of use according to an embodiment of the present invention.

The power system for the place of use 130 may correspond to one local area system configuring the smart grid 100. The power system for the place of use 130 may perform bidirectional communication with another local area system in the smart grid 100 and autonomously perform energy supply, consumption, storage, metering, management and communication.

The power system for the place of use 130 may roughly include an energy supply device, an energy consumption device, a local energy management device and an energy metering device.

The power system for the place of use 130 may receive information on general management of the components in the power system for the place of use 130 through a public channel. For example, information which may be received through the public channel may include a unit identifier, current rate information, relative level information (e.g., high, medium, and low) of the current rate, usage information (e.g., residential or commercial), error confirmation information (e.g., CRC information), etc. In addition, a broadcast reception information for receiving the public channel may include DMB-T (Digital Multimedia Broadcasting-Terrestrial), DMB-S (Digital Multimedia Broadcasting-Satellite), MediaFLO (Media Forward Link Only), DVB-H (Digital Video Broadcast-Handheld), ISDB-T (Integrated Services Digital Broadcast-Terrestrial), etc.

The energy supply device serves to supply power to all the components in the power system for the place of use 130 and may include a distributed power source, a centralized power source, and an energy storage device (Energy Storage System (ESS)).

The distributed power source means a source for supplying power other than power provided by an existing power plant, for example, power provided by another local area system or a self-power supply source (solar light, a wind power generation source, a fuel cell, etc.). The distributed power source may generate and store electricity through a solar photovoltaic fuel cell and a PVEC and provide electricity to another local area system. Although only the solar light, the wind power generation source and the fuel cell are shown in FIG. 3 as the example of the distributed power source, the present invention is not limited thereto.

The centralized power source means an energy source for supplying power through large-scale power generation in a district heating corporation. Specifically, electricity generated in an external power plant is transmitted to a power station through a transmission line and the power station transmits electricity to a substation. The centralized power source may mean an energy source supplied through a substation. The centralized power source has high efficiency and has high initial investment.

The ESS serves to store energy received from an external power source and to distribute energy into the components in the power system for the place of use 130 if necessary.

The energy consumption device consumes energy received from the energy supply device based on a command received from the local energy management device, and may include electric devices such as a home appliance, an automatic temperature control device, a cable set-top box, an automatic light control device. Examples of the energy consumption device may include home appliances (a refrigerator, a washing machine, an air conditioner, a cooker, a cleaner, a dryer, a dishwasher, a dehumidifier, a display device, a lighting device, etc.) or a heater, a motor, a display, etc. configuring the home appliance. In the present embodiment, the type of the energy consumption device is not limited.

The local energy management device serves to monitor and control all the components of the power system for the place of use 130. Each of the components configuring the local energy management device will be described below with reference to FIG. 4.

The energy metering device is connected to the energy supply device or the energy consumption device to measure the amount of used energy and to collect and analyze energy usage information and may include electricity meters, gas meters or water meters. The information acquired from the energy metering device may be transmitted to the global energy management device in the central control system 120.

Meanwhile, information acquired from the energy metering device may be transmitted to an external energy analysis device, and information acquired from the local energy management device may be transmitted to an external global energy management device or another local energy management device.

All the components of the power system for the place of use 130 may mutually perform bidirectional communication and may be controlled by the energy management device.

Hereinafter, the components of the energy management device according to the embodiment of the present invention will be described. The energy management device includes a global energy management device for controlling the energy of the smart grid 100 and an energy management device for controlling the energy of a local energy system.

Figure 4:
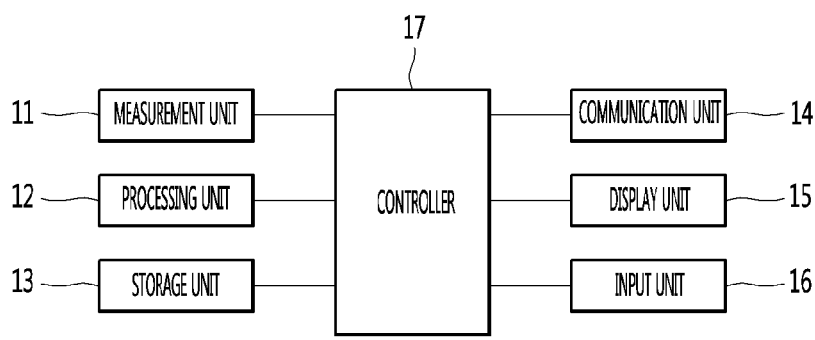
FIG. 4 is a block diagram showing the components of an energy management device according to an embodiment of the present invention.

FIG. 4 is a block diagram showing the components of an energy management device according to an embodiment of the present invention.

Referring to FIG. 4, the energy management device 10 according to the embodiment of the present invention may include a measurement unit 11, a processing unit 12, a storage unit 13, a communication unit 14, a display unit 15, an input unit 16 and a controller 17.

The measurement unit 11 measures and monitors the power state information of each component. The power state information of the component means information indicating the power state of the component configuring the smart grid 100. Here, the component may include a power plant, an electric company, a distributed power source, an energy management device, an energy metering device or an electric apparatus. Examples of the power state information may include instantaneous power consumption, cumulative power consumption, cumulative power generation, per-cycle power consumption, per-cycle power generation, or allowable power amount.

In addition, the measurement unit 11 may monitor a current energy state (e.g., energy consumption per hour or a current rate state), the current state of the component (e.g., active, standby, or under maintenance), an operation mode state (e.g., charging or in use), a power quality state (e.g., frequency, neural voltage, harmonic state), an environmental condition (e.g., temperature, humidity, motion, wind, light intensity) and environmental impact (e.g., $CO_2$ emission). Power state information measured by the measurement unit 11 may be output to the processing unit 12 or the controller 17 or may be transmitted to another energy management device 10 through the communication unit 14.

The processing unit 12 calculates energy consumption information using the power state information received from the measurement unit 11. The energy consumption information means information necessary to manage energy consumption of the user. Examples of the energy consumption information include energy cost of cumulative energy consumption, energy cost of instantaneous power consumption, energy cost per hour, energy cost for rate tiers/energy blocks, energy cost for time-of-use energy rates, cost for critical peak pricing, cost for capacity billing rates, cost due to billing factors (for example, taxes, rental rates or discount), cost according to user-defined parameters, cost according to history per cycle, the amount of power generated/consumed according to history per cycle, or environmental impact information (e.g., $CO_2$ emission or predicted $CO_2$ emission). The calculated energy consumption information may be displayed through the display unit 15 or transmitted to another energy management device via the communication unit 14.

The storage unit 13 stores the power state information of each device measured through the measurement unit 11 or energy consumption information calculated through the processing unit 12. The storage unit 13 may update the stored information at predetermined cycles. Specifically, the storage unit 13 may delete energy consumption information stored for a predetermined period or more and receive and store new energy consumption information at predetermined cycles. For example, the predetermined period in which the energy consumption information is stored may be three months and the cycle at which new energy consumption information is received may be one day. However, this is merely an example, and the present invention is not limited thereto. That is, the energy management cycle may be set by receiving an arbitrary command.

The communication unit 14 may be wired or wireless and may transmit information output from the measurement unit 11, the processing unit 12 and the controller 17 to another energy management device 10 or transmit information received from another energy management device 10 to the measurement unit 11, the processing unit 12, the storage unit 13 and the controller 17. The communication unit 14 may be a simple communication line or a power line communication means. The power line communication means may include a communication device (e.g., a modem, etc.) connected to two components. In another example, the communication unit 14 may be ZigBee, Wi-Fi, Bluetooth, etc.

The display unit 15 displays information necessary for energy management. Specifically, the display unit 15 may display the operation state of each component or reset information capable of setting initialization of each component. For example, the display unit 15 may provide alarm information (e.g., an alarm indicating limit price information and an event message) and display detailed information of each component (e.g., device type, model name, default setting, and battery lifespan).

In addition, the display unit 15 may display power state information of the device measured by the measurement unit 11, energy consumption information calculated by the processing unit 12 or information received by the communication unit 14. The display unit 15 may display energy related information transmitted through the controller 17. For example, the controller 17 may transmit an energy supply pattern, an energy consumption pattern or an energy warning signal analyzed using various types of information stored in the storage unit 13 to the display unit 15. In addition, the display unit 15 may display a user command received through the input unit 16.

Meanwhile, the display unit 15 may be composed of a touchscreen to receive a user command through touch input.

The input unit 16 may receive a user command necessary for energy management. For example, the input unit 16 may receive a user command for controlling the energy supply device or the energy consumption device or receive an energy movement information display command of the smart grid 100 or a local energy system. In another example, the input unit 16 may receive a command for inputting various types of setting information necessary to control the energy management device 10.

The input unit 16 transmits user input information to the measurement unit 11, the processing unit 12 or the controller 17.

The controller 17 controls overall operation necessary for operation of the energy management device 10. The controller 17 controls the energy management device 10 by an input signal. For example, the controller 17 may control on/off of an electric load or may control on/off of an electric load according to time interval settings. The controller 17 may perform more accurate control according to user settings within a predetermined threshold. In addition, the controller 17 may restrict the operation mode according to a threshold, a set value or a price point. For example, upon reaching a certain price point during operation of a standard mode, the standard mode may be restricted and converted into an conservation mode. The controller 17 outputs a control command optimal for efficient power consumption based on input information received from the input unit 16.

Figure 5:
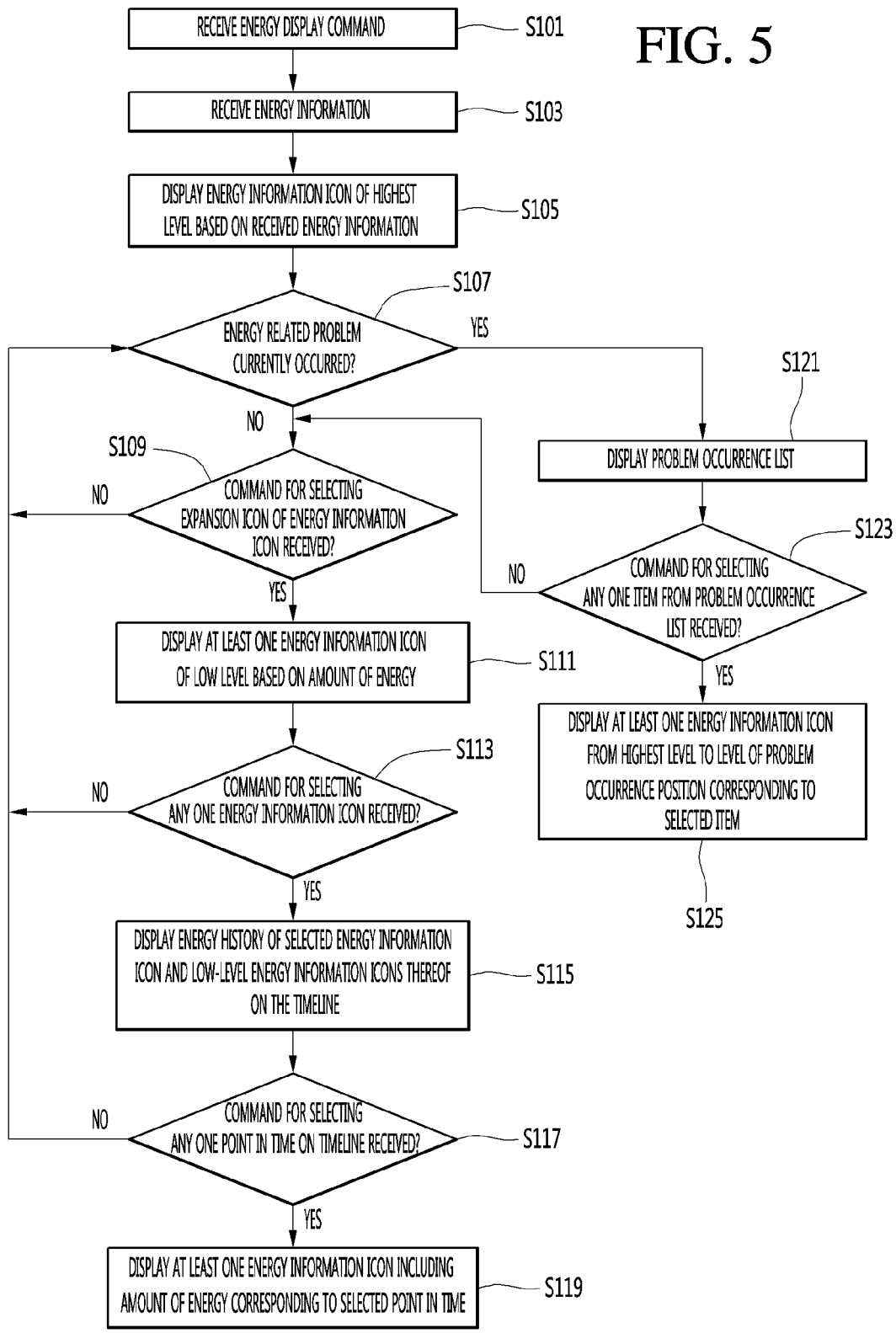
FIG. 5 is a flowchart illustrating a method of displaying energy data at an energy management device according to an embodiment of the present invention.

Next, FIG. 5 is a flowchart illustrating a method of displaying energy data at an energy management device according to an embodiment of the present invention.

Specifically, the energy management device 10 may display energy movement information in a local area system or a global area system. Hereinafter, a method of displaying movement information at the energy management device 10 will be described.

The controller 17 may receive an energy display command (S101).

The input unit 16 may receive and transmit the energy display command to the controller 17. That is, the controller 17 may receive the energy display command through the input unit 16.

The energy display command may refer to a command for displaying energy movement information. Specifically, the energy display command may refer to a command for displaying energy movement information such as an energy movement direction, an energy movement amount and an energy movement path in a system to which the energy management device 10 belongs.

In the power system for the power plant, the energy movement information may include movement information of energy generated in at least one power plant and supplied to one storage (or the place of use). Specifically, the energy movement information may include the type of an energy supply source, the amount of energy supplied from each energy supply source and a movement path.

In the power system for the place of use, the energy movement information may mean the amount of energy consumed by each component of the system and an energy movement path. Specifically, the total energy of the system may include the type of an energy source consumed by each component of the system, an energy consumption device, consumption and a consumption path.

However, this is an example and the energy movement information according to the embodiment of the present invention may include all information related to energy generation, storage, distribution or use. Hereinafter, as the energy display command is received, a method of displaying the energy movement information consumed in one system such as a building or a house will be described and the present invention is equally applicable to the case where the energy movement information is displayed in another system (e.g., a power system for a power plant for supplying energy).

The controller 17 may receive energy information as the energy display command is received(S103).

The controller 17 may receive energy information through the communication unit 14, in order to display the energy movement information according to the communication unit 14.

The communication unit 14 may receive energy information of the global area system or energy information of the local area system.

The communication unit 14 may receive energy information of the system to which the energy management device 10 belongs. For example, the energy management device 10 provided in the power system for the power plant may receive energy information supplied in the power system for the power plant through the communication unit 14. In another example, the energy management device 10 provided in the power system for the place of use may receive energy information consumed in the power system for the place of use through the communication unit 14. Energy information may include an energy consumption position, the amount of consumed energy, an energy supply position, and the amount of supplied energy.

The communication unit 14 may receive energy data supplied or consumed by each component from at least one component configuring the system. For example, the communication unit 14 may receive energy information supplied by at least one energy supply device of the system or energy information consumed by at least one energy consumption device of the system.

Alternatively, the communication unit 14 may receive energy information supplied or consumed by at least one component through the energy metering device included in the system.

For example, the communication unit 14 may receive energy data of the distributed power source (solar light, wind power plant, fuel cell, etc.), the centralized power source and the ESS configuring the energy supply device of the power system for the place of use 130 and energy data of at least one electric device configuring the energy consumption device. However, this is merely an example and additional information may be further received or omitted according to the components configuring the power system for the place of use 130.

The controller 17 may receive an energy information icon of a highest level based on the received energy information (S105).

The controller 17 may perform control such that the processing unit 12 analyzes the energy movement information in the system using the received energy information. Specifically, the processing unit 12 may analyze total energy supplied to the power system for the place of use 130, a consumption pattern of the total energy, the energy consumption device, the amount of consumed energy, the energy movement path, etc.

The controller 17 may control the display unit 15 to display at least one energy information icon based on the result analyzed by the processing unit 12. For example, the controller 17 may display the energy information icon of the highest level.

In the present invention, the level may mean an energy level subdivided from the total energy of the system. Specifically, in the present invention, the energy supply mode of the energy supply system or the energy consumption mode of the energy consumption system may be divided into a plurality of levels. Therefore, for example, in the power system for the place of use 130, the energy of the highest level may mean total energy, and the energy of the lowest level may mean primary energy consumed by each energy consumption device. In addition, energy of a level higher than the lowest-level energy by one level may mean secondary energy obtained by summing the primary energies consumed by the energy consumption devices according to a predetermined criterion. In addition, energy of a level higher than the lowest-level energy by two levels may mean third energy obtained by summing the secondary energies according to a predetermined criterion. The energy of the highest level may mean final energy consumption obtained through summing according to a predetermined criterion.

Therefore, low-level energy lower than the highest-level energy by one level may mean a plurality of energies divided before being combined to the total energy.

Meanwhile, in the power system for the power plant 110, energy of the highest level may mean the energy of a substation. Specifically, in the power system for the power plant 110, energy generated in each power plant is transmitted to the power station through the transmission line and transmitted from the power station to the substation. Accordingly, the highest-level energy may mean the energy of the substation and the low-level energy lower than the highest-level energy by one level may mean the energy of the power station.

However, the above description is merely an example and the energy level may be variously divided according to the property of the system.

In the present invention, the energy information icon may refer to an icon visually representing the energy information of each component configuring the system to which the energy management device belongs. According to the embodiment of the present invention, the energy information icon may include the position of the energy and the amount of energy at the energy position. Here, the energy position may mean a device or energy source in or to which energy is consumed or supplied, and the amount of energy may mean a numerical value indicating the amount of energy consumed or supplied.

Next, the energy information icon according to the embodiment of the present invention will be described with reference to FIG. 6. Specifically, FIG. 6 is a diagram illustrating an energy information icon of a highest level according to an embodiment of the present invention.

Figure 6:
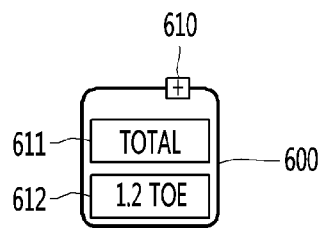
FIG. 6 is a diagram illustrating an energy information icon of a highest level according to an embodiment of the present invention.

As shown in FIG. 6, the display unit 15 may display the energy information icon 600 of the highest level.

The energy information icon 600 may include an expansion icon 610, an energy position item 611 and an energy amount item 612.

The expansion icon 610 displays a low-level energy information icon corresponding to a current energy information icon. When a command for selecting the expansion icon 610 is selected, the controller 17 may perform control to display at least one low-level energy information icon corresponding to the energy information icon of the selected expansion icon 610 on the display unit 15.

In addition, as the low-level energy information icon is displayed, the controller 17 may change the expansion icon 610 to a reduction icon (not shown). When a command for selecting the reduction icon is received, the controller 17 may perform to control to remove the displayed low-level energy information icon. As the low-level energy information icon is removed, the controller 17 may change the reduction icon to the expansion icon.

The energy management device can display the energy movement path through the expansion icon 610 in detail.

The energy position item 611 may include the name of the device in or to which energy is consumed or supplied and a name or energy source including the same. For example, "total" of the energy position item 611 shown in FIG. 6 may indicate a total sum of the energy consumed by all energy consumption devices of the system. The "total" shown in FIG. 6 is an example and the name displayed in the energy position item 611 may be set by default or by user input.

The energy amount item 612 indicates the amount of supplied or consumed at the energy position indicated by the energy position item 611. For example, referring to the energy information icon 600 shown in FIG. 6, the total energy consumed by all energy consumption devices of the system is "1.2 TOE".

The unit of the energy displayed in the energy amount item 612 may be set by default or user input. For example, the unit of the energy displayed in the energy amount item 612 may be TOE, W or t (ton).

FIG. 5 will be described again.

The controller 17 may determine whether an energy related problem currently occurs (S107).

When energy related problem has occurred, the controller 17 may easily display a position where the problem has occurred through the energy information icon. This will be described in detail with reference to FIGS. 14 to 18 (steps S121, S123 and S125).

Meanwhile, when energy related problem has not occurred, the controller 17 may determine whether a command for selecting the expansion icon of the energy information icon is received (S109).

When the command for selecting the expansion icon of the energy information icon is not received, the controller 17 proceeds to step S107.

In contrast, when the command for selecting the expansion icon of the energy information icon is received, the controller 17 may display at least one energy information icon of the low level based on the amount of energy (S111).

Next, a method of expanding and displaying an energy information icon at the energy management device 10 according to the embodiment of the present invention will be described with reference to FIGS. 7 to 10.

As shown in FIG. 6, the display unit 15 may display the energy information icon 600 of the highest level. When a command for selecting the expansion icon 610 is received, the controller 17 may display at least one energy information icon of the low level through an energy node.

The energy node is a component for connecting an energy information icon of a high level with an energy information icon of a low level. The energy node indicates an energy movement relationship between a high level and a low level.

Figure 7:
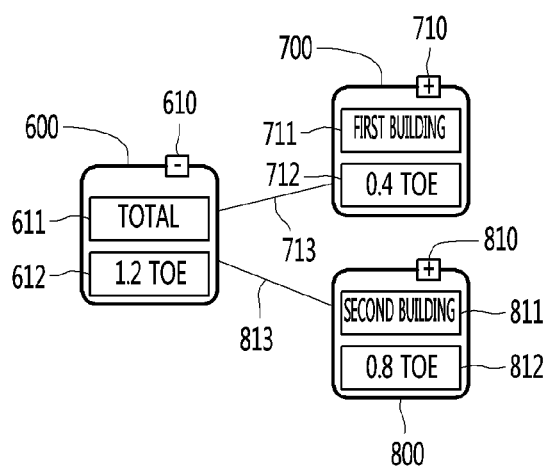
FIG. 7 is a diagram illustrating a method of displaying an energy information icon according to a first embodiment of the present invention.

Next, FIG. 7 is a diagram illustrating a method of displaying an energy information icon according to a first embodiment of the present invention.

According to the first embodiment of the present invention, the controller 17 may display energy information icons 710 and 810 of the low level through energy nodes 713 and 813 having the same thickness.

The method of displaying the energy information icon according to the first embodiment will be described in detail through the example shown in FIG. 7. When the command for selecting the expansion icon 610 of the energy information icon 600 indicating the total energy is received, the controller 17 may display the energy information icon 700 of a first building and the energy information icon 800 of a second building of a level lower than the total energy by one level. At this time, the energy information icon 600 of the high level is connected with the energy information icons 700 and 800 of the low level through the energy nodes 713 and 813 having the same thickness.

The energy information icons 600, 700 and 800 respectively include the amount of consumed energy in the energy amount items 612, 712 and 812 to indicate the energy movement information. Specifically, the total energy consumption (1.2 TOE) may be equal to a sum of the energy consumption (0.4 TOE) of the first building and the energy consumption (0.8 TOE) of the second building.

Figure 8:
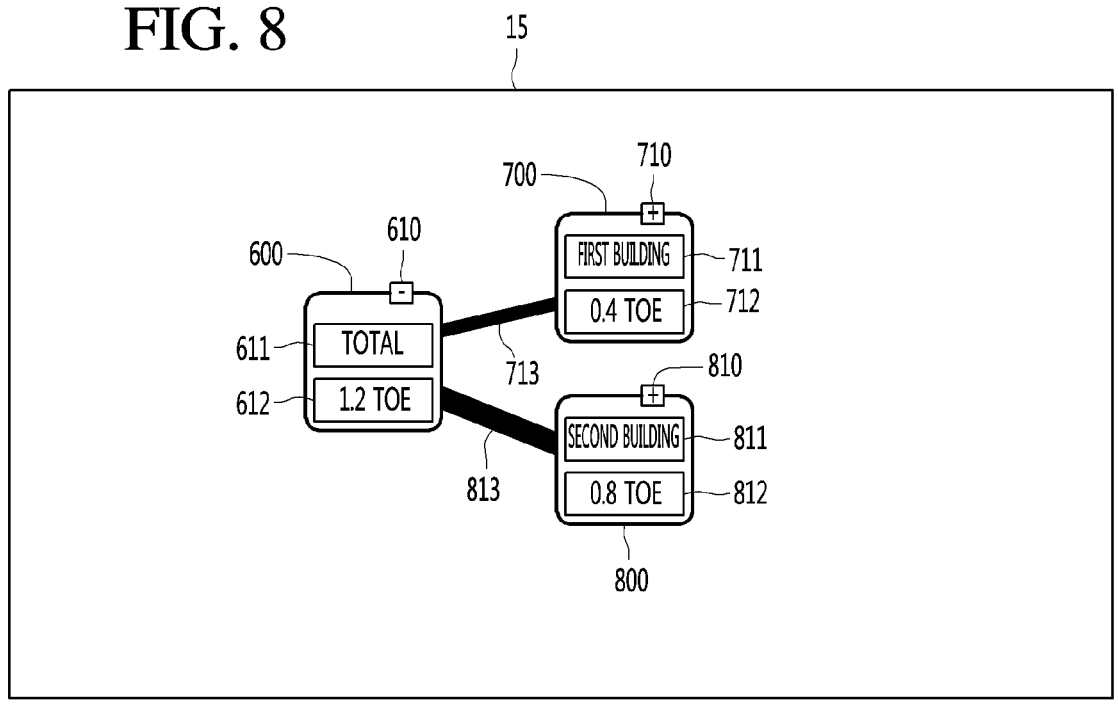
FIG. 8 is a diagram illustrating a method of displaying an energy information icon according to a second embodiment of the present invention.

Next, FIG. 8 is a diagram illustrating a method of displaying an energy information icon according to a second embodiment of the present invention.

According to the second embodiment of the present invention, the controller 17 may display the energy information icons of the low level through the energy nodes 713 and 813 having different thicknesses according to the amount of energy.

The method of displaying the energy information icon according to the second embodiment will be described in detail through the example shown in FIG. 8. When the command for selecting the expansion icon 610 of the energy information icon 600 indicating the total energy is received, the controller 17 may display the energy information icon 700 of the first building and the energy information icon 800 of the second building of a level lower than the total energy by one level. The energy information icon 600 of the high level is connected with the energy information icons 700 and 800 of the low level through the energy nodes 713 and 813 differently displayed according to the amount of energy.

Specifically, the controller 17 may display the thicknesses of the energy nodes 713 and 813 which differ according to the amount of energy displayed in the low-level energy information icon. For example, the controller 17 may increase the thicknesses of the energy nodes 713 and 813 in proportion to the amounts 712 and 812 of energy of the energy information icons 700 and 800 of the low level. Referring to FIG. 8, since the energy amount (0.8 TOE) of the second building is twice the energy amount (0.4 TOE) of the first building, the thickness of the energy node 813 connected to the energy information icon 800 of the second building is twice that of the energy node 713 connected to the energy information icon 700 of the first building.

The energy node indicates the amount of moved energy. In the method of displaying the energy information icon according to the second embodiment, it is possible to intuitively display energy flow in the system.

Figure 9:
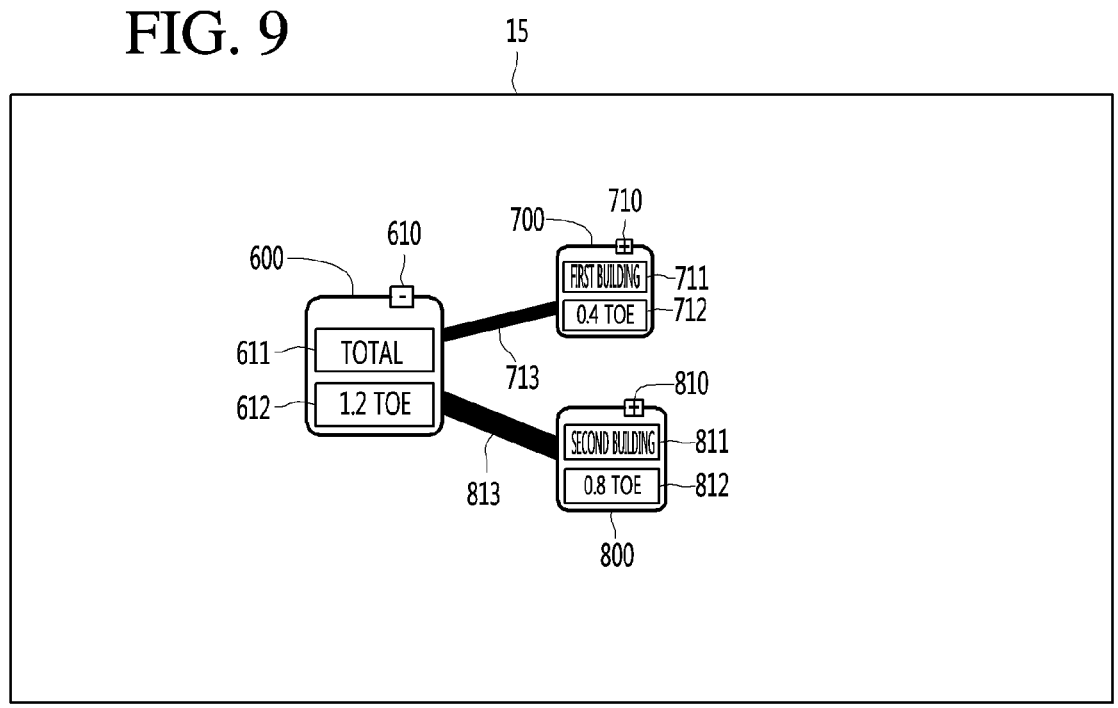
FIG. 9 is a diagram illustrating a method of displaying an energy information icon according to a third embodiment of the present invention.

Next, FIG. 9 is a diagram illustrating a method of displaying an energy information icon according to a third embodiment of the present invention.

According to the third embodiment of the present invention, the controller 17 may adjust the size of the energy information icon according to the amount of energy to display the energy information icons of the low level.

The method of displaying the energy information icon according to the third embodiment will be described in detail through the example shown in FIG. 9. When the command for selecting the expansion icon 610 of the energy information icon 600 indicating the total energy is received, the controller 17 may display the energy information icon 700 of the first building and the energy information icon 800 of the second building of a level lower than the total energy by one level. At this time, the controller 17 may adjust the sizes of the energy information icons 700 and 800 according to the energy amounts 712 and 812 displayed in the energy information icons 700 and 800 of the low level.

Specifically, the controller 17 may increase the sizes of the energy information icons in proportion to the amount of energy displayed in the energy amount item and display the energy information icons. Referring to FIG. 9, since the total amount of energy is 1.2 TOE, the amount of energy of the second building is 0.8 TOE and the amount of energy of the first building is 0.4 TOE, the controller 17 displays the energy information icon 600 having a largest size, the energy information icon 800 of the second building having a second-largest size and the energy information icon 700 of the first building having a smallest size.

According to the third embodiment, it is possible to clearly indicate the amount of energy and the energy movement relationship by differentiating the sizes of the energy information icons.

Figure 10:
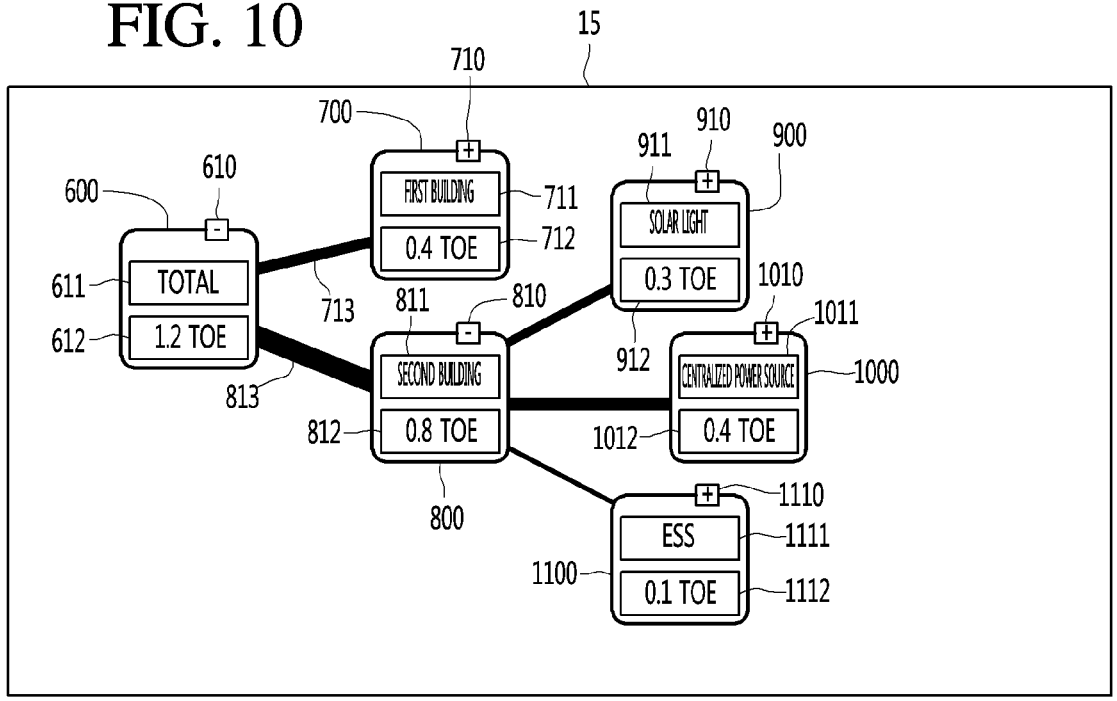
FIGS. 10 to 11 are diagrams illustrating a method of displaying an energy information icon of a low level through an expansion icon according to an embodiment of the present invention.
Figure 11:
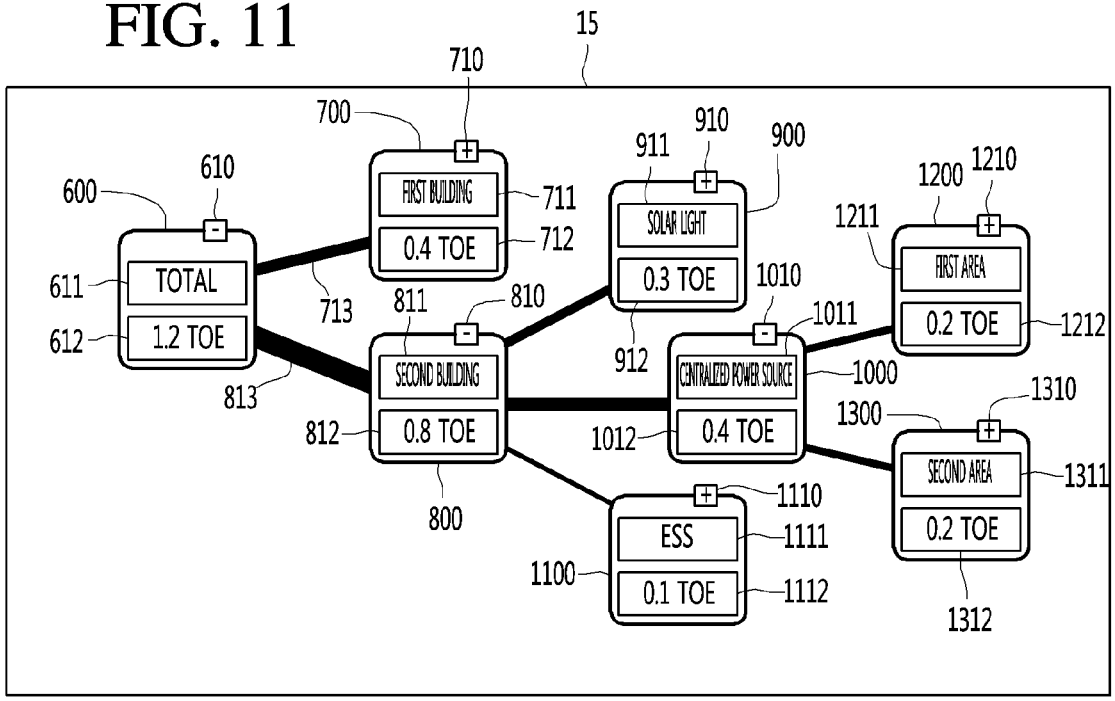

Next, FIGS. 10 and 11 are diagrams showing a method of displaying energy information icons of the low level through an expansion icon according to the embodiment of the present invention. Specifically, FIGS. 10 to 11 are diagrams illustrating a state in which the low-level energy information icons are displayed through the method of displaying the energy information icon according to the second embodiment of the present invention.

The controller 17 may receive a command for selecting any one expansion icon 810 of the energy information icons 700 and 800 of the level lower than the highest level by one level in a state of displaying the energy information icon 600 of the highest level and the energy information icons 700 and 800 of the level lower than the highest level by one level. As shown in FIG. 10, the controller 17 may display the energy information icons 900, 1000 and 1100 of the level lower than the energy information icon 800 of the selected expansion icon 810 by one level. The energy information icons 900, 1000 and 1100 are located at the level lower than the energy information icon 600 of the highest level by two levels.

Accordingly, referring to FIG. 10, the energy (0.8 TOE) consumed in the second building is consumed through the solar light (0.3 TOE), the centralized power source (0.4 TOE) and the ESS (0.1 TOE). However, this is merely an example and may vary according to energy information received through the communication unit 14.

Similarly, referring to FIG. 11, the controller 17 may receive a command for selecting an expansion icon 1010 of any one energy information icon 1000 of the level lower than the highest level by two levels. Then, the controller 170 may display the low-level energy information icons 1200 and 1300 of the energy information icon 1000 including the selected expansion icon 1010. The energy information icons 1200 and 1300 are located at the level lower than the highest level by three levels.

The controller 17 may display the energy information icons from the highest level to the lowest level. In this case, the user can directly grasp the energy movement path from the highest level to the lowest level.

In addition, the controller 170 may indicate energy data in the energy amount item, make the thickness of the energy node different or make the size of the energy information icon different, thereby efficiently displaying the energy movement information. Specifically, it is possible to intuitively display energy flow by adjusting the thickness of the energy node and to intuitively display the amount of energy by adjusting the size of the energy information icon. The user can easily grasp energy flow through the energy information icon and the energy node displayed on the display unit 15.

FIG. 5 will be described again.

The controller 17 may determine whether a command for selecting any one energy information icon is received (S113).

When the command for selecting any one energy information icon is not received, the controller 17 returns to the above-described step S107.

When the command for selecting any one energy information icon is received, the controller 17 may display the energy history of the selected energy information icon and the low-level energy information icons thereof on the timeline (S115).

The timeline is a component indicating energy data with time. That is, the controller 17 may display the energy data of the selected energy information icon and the low-level energy information icons thereof on the timeline with time.

Next, a method of displaying an energy history on a timeline at the energy management device according to the embodiment of the present invention will be described with reference to FIGS. 12 to 14.

Figure 12:
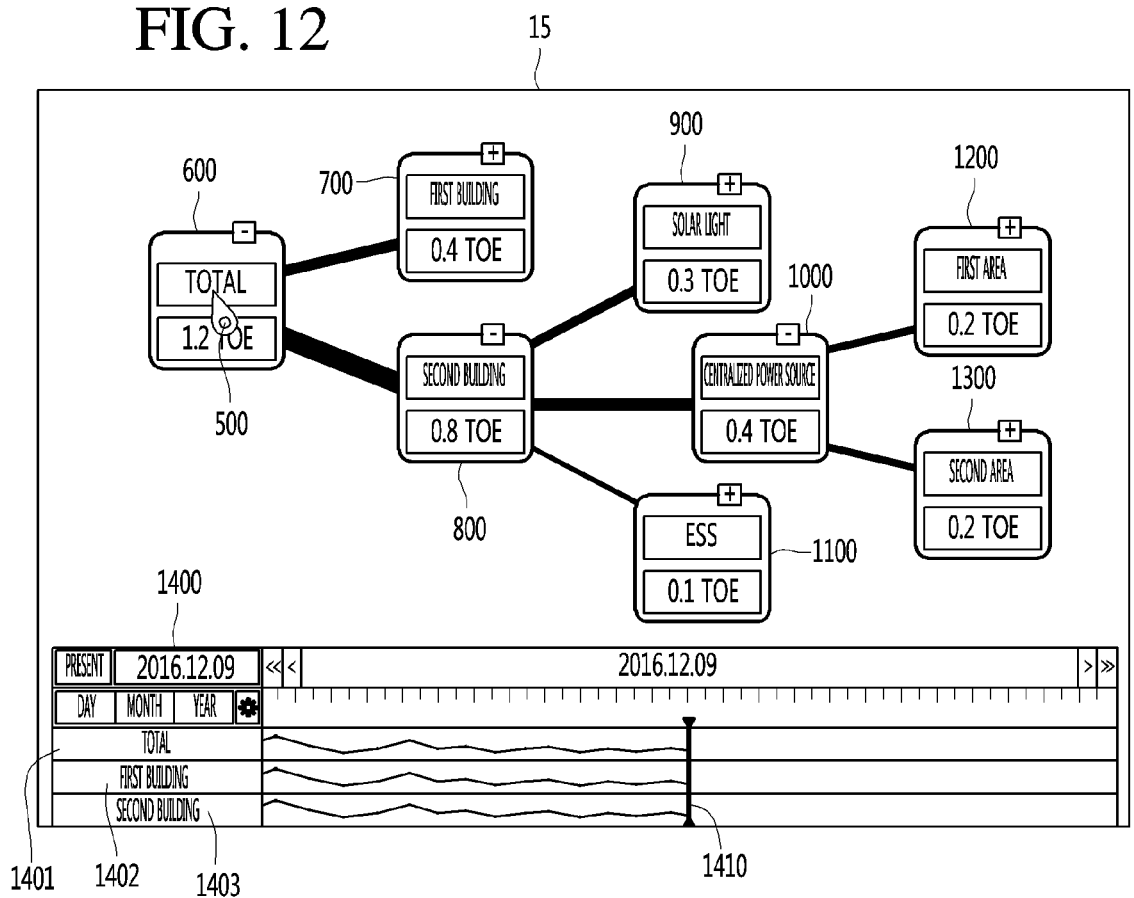
FIG. 12 is a diagram illustrating a method of displaying an energy history on a timeline at an energy management device according to an embodiment of the present invention.

Referring to FIG. 12, the controller 17 may receive a command for selecting any one energy information icon 600 among one or more energy information icons displayed on the display unit 15. The controller 17 may display the energy data of the selected energy information icon 600 and the energy information icons 700 and 800 corresponding to the low level of the energy information icon 600 on the timeline 1400 with time.

Specifically, the controller 17 may perform control to display the energy history of the selected energy information icon 600 and the energy information icons 700 and 800 of the lower level lower than the energy information icon 600 by one level on the timeline 1400.

Alternatively, the controller 17 may set the level of the low-level energy information icon, the energy history of which will be displayed on the timeline 1400. In this case, the controller 170 may display the selected energy information icon 600 and the energy information icon of the low level up to the set level. For example, the controller 17 may set the level of the low-level energy information icon, the energy history of which will be displayed on the timeline 1400, to two levels. In this case, the controller 170 may display the energy histories of the selected energy information icon 600, the energy information icon of the lower level than energy information icon 600 by one level and the energy information icon of the lower level than energy information icon 600 by two levels on the timeline 1440.

Alternatively, the controller 17 may set the number of energy histories to be displayed on the timeline 1400 in advance. In this case, the controller 170 may display the energy histories of the selected energy information icon 600 and the set number of low-level energy information icons on the timeline 1400. For example, the controller 17 may set the number of energy histories to be displayed on the timeline 1400 to 5. In this case, the controller 170 may display the energy histories of the selected energy information icon 600 and the energy histories of four energy information icons corresponding to the lower levels of the energy information icon 600 on the timeline 1400.

The timeline 1400 includes energy positions 1401, 1402 and 1403 and the energy histories corresponding to the energy positions. The energy history indicates energy data with time. The energy data may be displayed in the form of a graph as shown in FIG. 12.

In addition, the timeline 1400 may further include a timepoint selection bar 1410. The timepoint selection bar 1410 is used to show the energy movement information at a certain point in time in detail. That is, the controller 17 may perform control to display the energy movement information at the point in time selected through the timepoint selection bar 1410 using the energy information icon.

When the timeline 1400 is displayed, the controller 17 may display the timepoint selection bar 1410 corresponding to the current point in time. The controller 17 may display the energy movement information at the current point in time through at least one energy information icon.

In addition, the controller 17 may move the timepoint selection bar 1410 to display past energy information. Hereinafter, this will be described in detail.

FIG. 5 will be described again.

The controller 17 may receive a command for selecting any one point in time on the timeline 1400 (S117).

When the command for selecting any one point is received, the controller 17 may display at least one energy information icon corresponding to the selected point in time (S119).

Next, the method of displaying the energy information icon corresponding to the selected point on the timeline 1400 at the energy management device 10 according to the embodiment of the present invention will be described with reference to FIGS. 13 to 14. FIGS. 13 to 14 are diagrams illustrating a method of displaying past energy data at an energy management device according to an embodiment of the present invention.

The controller 17 may receive a command for selecting any one point on the timeline 1400 through a pointer 500. Then, the controller 17 may display the timepoint selection bar 410 at a position corresponding to the selected point in time.

In addition, the controller 17 may display the energy information icon including the amount of energy corresponding to the point in time where the timepoint selection bar 410 is located.

Figure 13:
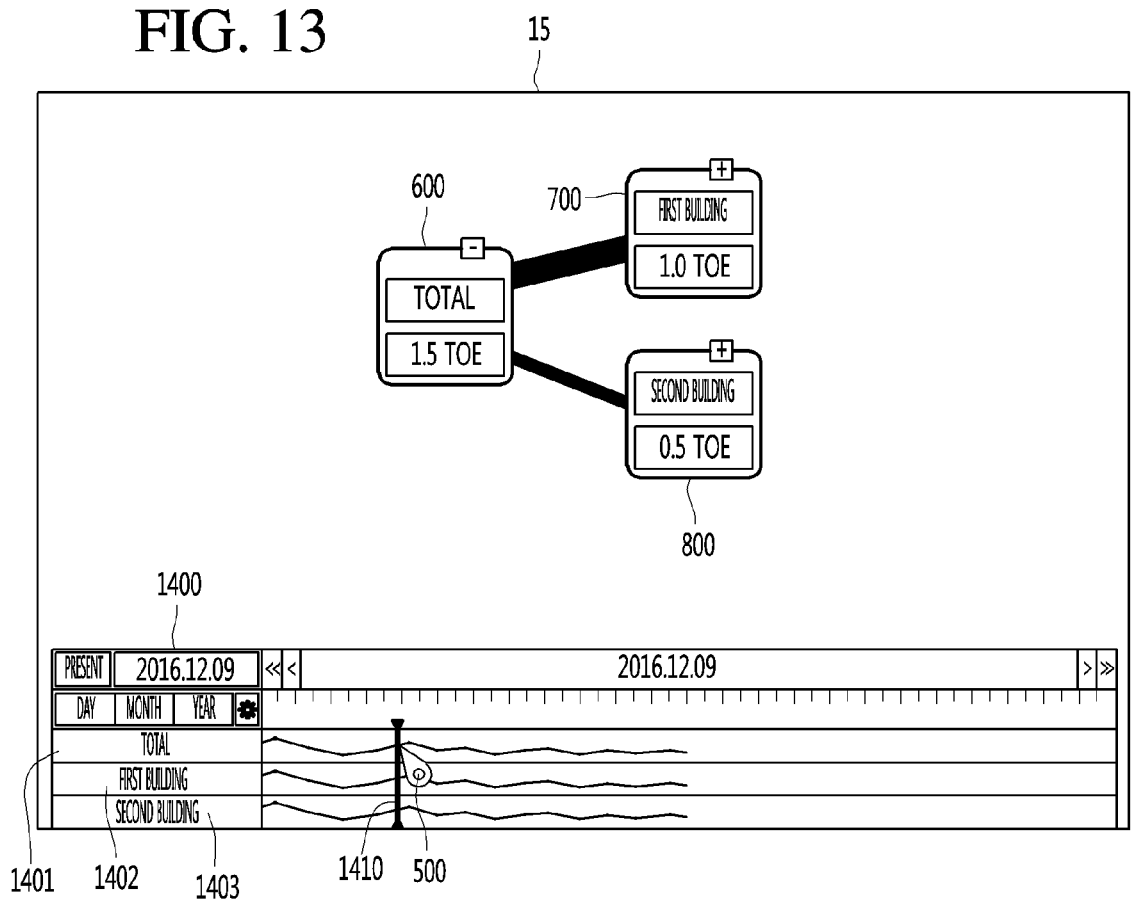
FIGS. 13 to 14 are diagrams illustrating a method of displaying past energy data at an energy management device according to an embodiment of the present invention.

According to the first embodiment of the present invention, as shown in FIG. 13, the controller 17 may display only the energy information icons 600, 700 and 800 corresponding to the energy positions 1401, 1302 and 1403 which are displayed on a timeline 1410.

Figure 14:
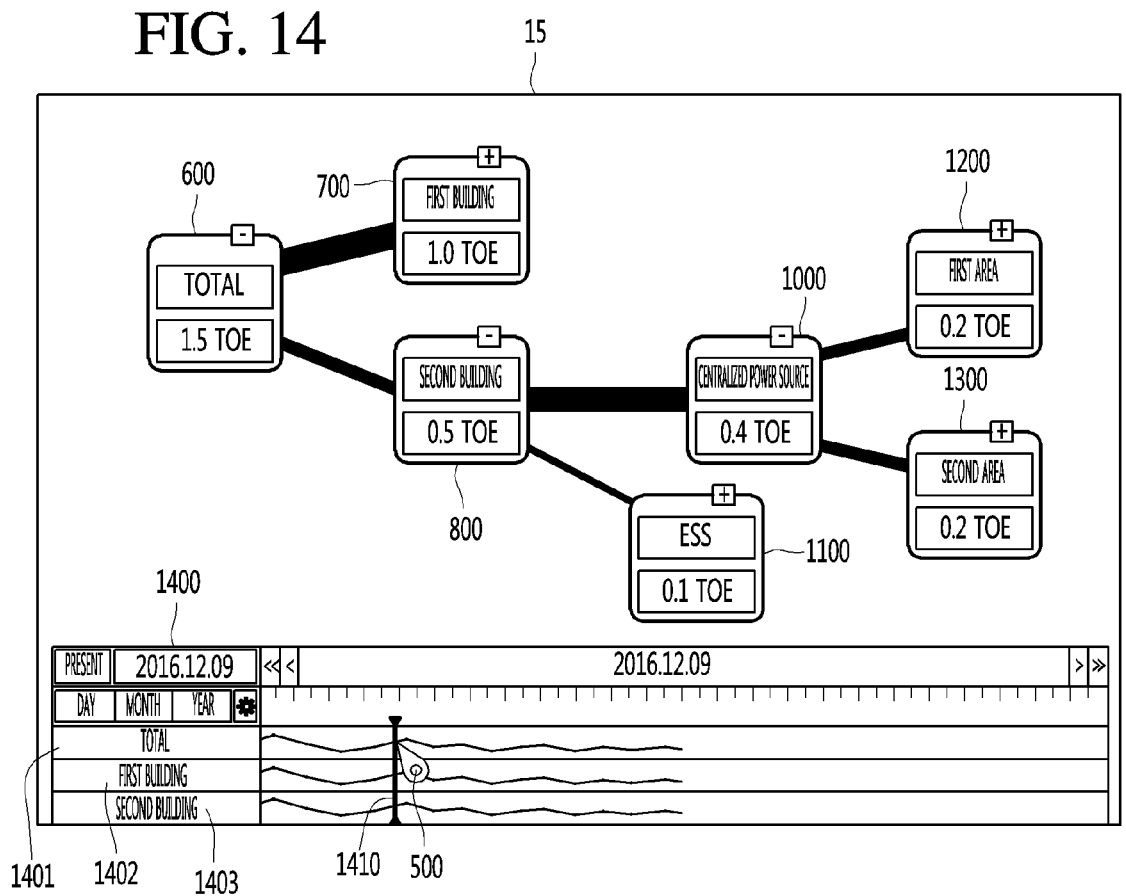

According to the second embodiment of the present invention, as shown in FIG. 14, the controller 17 may change only the amount of energy to energy data corresponding to the selected point in time while displaying the same energy information icon as the currently displayed energy information icon. When all energy supplied from the solar light, the centralized power source and the ESS is consumed at present (FIG. 12) but only energy supplied from the centralized power source and the ESS is consumed at the selected point in time (FIG. 14), the energy information icon corresponding to the solar light may be removed.

When a command for selecting one point in time on the timeline 1400 is received and the amount of energy corresponding to the selected point in time is displayed through the energy information icon, it is possible display not only current energy information but also past energy information in detail. The user may easily change a point in time through the timeline 1400 to grasp past energy data.

However, when the command for selecting any one point in time is not received, the controller 17 may return to step S107.

FIG. 5 will be described again.

The controller 17 may determine whether an energy related problem currently occurs (S107).

Specifically, the controller 17 may monitor occurrence of the energy related problem in real time.

The controller 17 may display a problem occurrence list when the energy related problem has occurred (S121).

The controller 17 may display the problem occurrence list along with at least one energy information icon which is currently being displayed, when the energy related problem has occurred.

Figure 15:
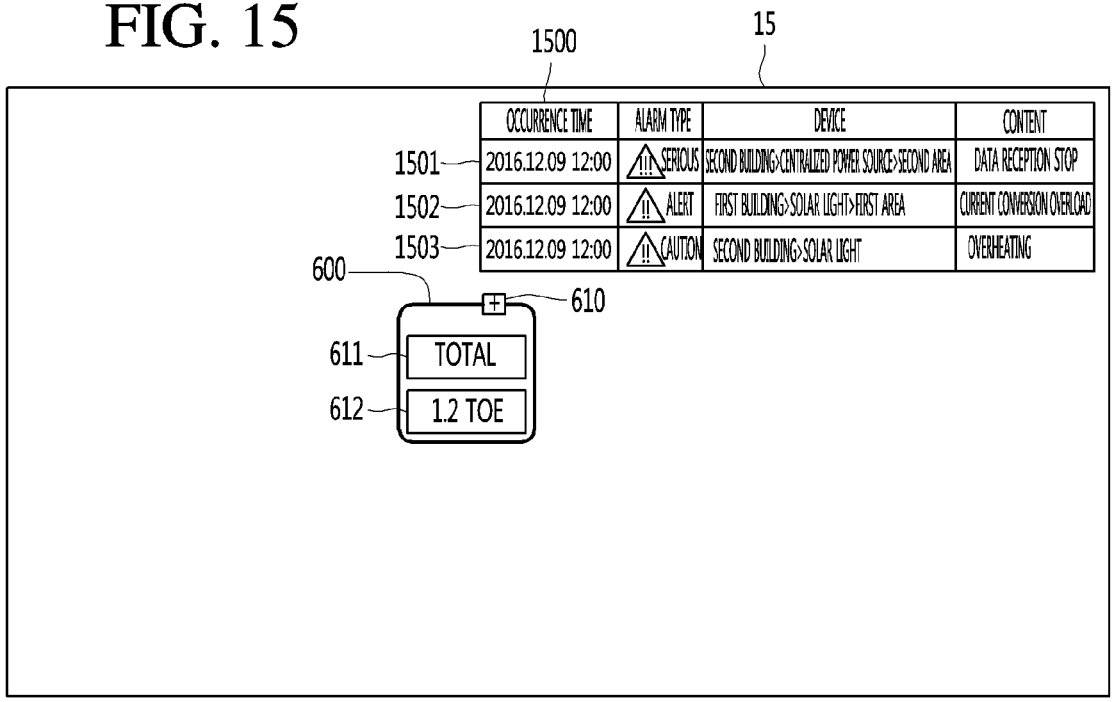
FIG. 15 is a diagram illustrating a method of displaying a problem occurrence list at an energy management device according to an embodiment of the present invention.

Next, FIG. 15 is a diagram illustrating a method of displaying a problem occurrence list at an energy management device according to an embodiment of the present invention.

As shown in FIG. 15, the display unit 15 may generate a problem occurrence list 1500.

The problem occurrence list 1500 includes information on at least one problem currently detected in the system. Referring to the example shown in FIG. 15, the problem occurrence list 1500 includes a first problem item 1501, a second problem item 1502 and a third problem item 1530. Each problem item may include a problem occurrence time, a warning grade, an occurrence position and content. The user can acquire information related to the problem by referring to information in the problem item. However, it may be difficult for the user to analyze the exact cause of the problem by referring to only the occurrence position and the content. The energy management device may provide detailed information related to any one problem displayed in the problem occurrence list 1500 through the below-described method.

FIG. 5 will be described again.

The controller 17 may receive a command for selecting any one item from the problem occurrence list 1500 (S123).

The controller 17 may receive a command for selecting any one item from the problem occurrence list 1500 through a pointer 500. The pointer 500 may move according to a signal received through the input unit 16.

When the command for selecting any one item from the problem occurrence list 1500 is received, the controller 17 may display at least one energy information icon from the highest level to the level of the problem occurrence position corresponding to the selected item (S125).

When a command for selecting any one item from the problem occurrence list 1500 is received, the controller 17 may acquire a problem occurrence position corresponding to the selected item. In addition, the controller 17 may display at least one energy information icon on the display unit 15 from the energy information icon of the highest level to the level of the problem occurrence position.

Figure 16:
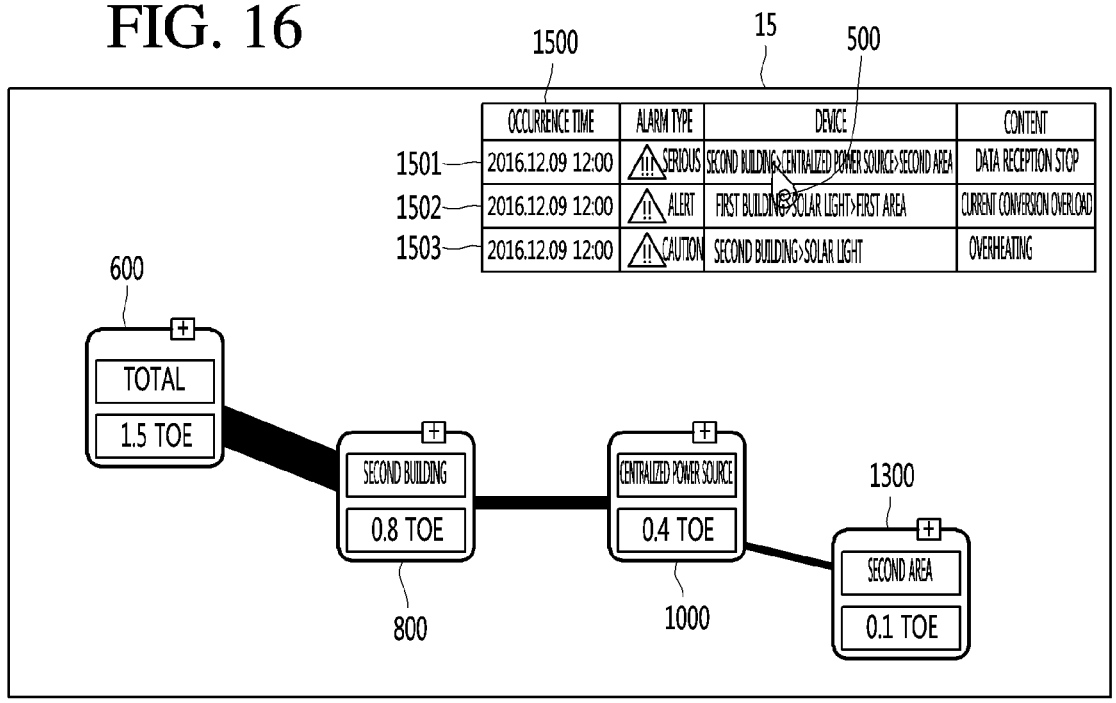
FIG. 16 is a diagram illustrating a method of displaying a problem occurrence position using an energy information icon according to a first embodiment of the present invention.

Next, the method of displaying the problem occurrence position using the energy information icon according to a first embodiment of the present invention will be described with reference to FIG. 16.

The controller 17 may receive a command for selecting any one item 1501 from the problem occurrence list 1500. The controller 17 may acquire the problem occurrence position indicated by the selected item 1501. For example, the problem occurrence position may be a second area. Therefore, the controller 17 may display the energy information icon 600 of the highest level, the energy information icon 1300 corresponding to the problem occurrence position and at least one energy information icon 800 and 100 included between the highest level and the problem occurrence position.

The controller 17 may display a direct path to the problem occurrence position through at least one energy information icon, thereby reducing a time required to find, analyze and solve an energy related problem in the system.

Alternatively, according to the second embodiment of the present invention, the controller 17 may perform control to display all the highest level, the level, to which the problem occurrence position belongs, and the levels included therebetween. That is, it is possible to further display at least one energy and the energy information icon of the same level related thereto according to the first embodiment of the present invention.

Figure 17:
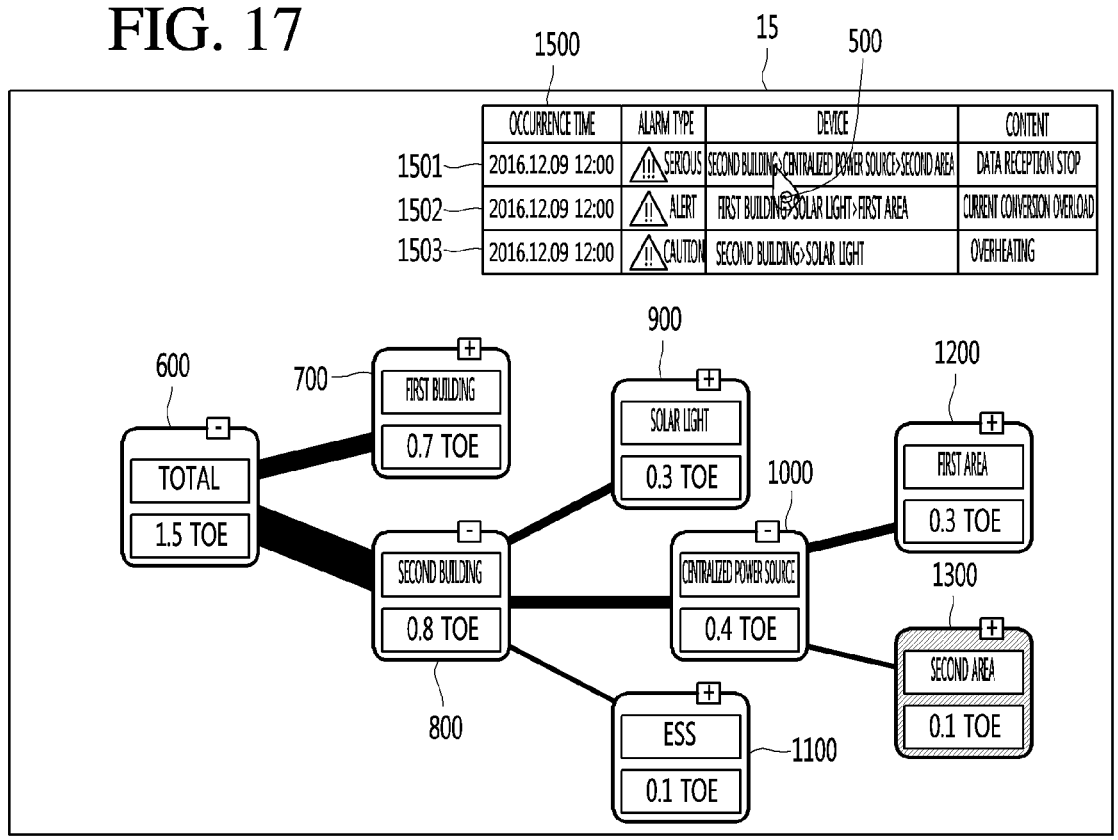
FIG. 17 is a diagram illustrating a method of displaying a problem occurrence position using an energy information icon according to a second embodiment of the present invention.

FIG. 17 is a diagram illustrating a method of displaying a problem occurrence position using an energy information icon according to a second embodiment of the present invention.

The controller 17 may receive a command for selecting any one item 1501 from the problem occurrence list 1500. The controller 17 may acquire the problem occurrence position indicated by the selected item 1501. For example, the problem occurrence position may be a second area.

Therefore, the controller 17 may display all the energy information icon corresponding to the highest level, the level, to which the problem occurrence position belongs, and the levels included therebetween. In particular, as shown in FIG. 17, the controller 17 may expand and display the problem occurrence paths 800, 1000 and 1300 and the energy information icons of the same level related thereto.

Therefore, the controller 17 may display peripheral energy information related to the problem occurrence path along with the problem occurrence path. In addition, it is possible to display the occurrence position of the energy related problem in the system step by step.

In addition, the controller 17 may highlight the energy information icon 1300 corresponding to the problem occurrence position. That is, the controller 17 may display the energy information icon 1300 corresponding to the problem occurrence position to be distinguished from the other energy information icons. For example, the controller 17 may display the energy information icon 1300 corresponding to the problem occurrence position with a color different from that of the other energy information icons.

Therefore, the user can grasp the problem occurrence position at a glance.

Figure 18:
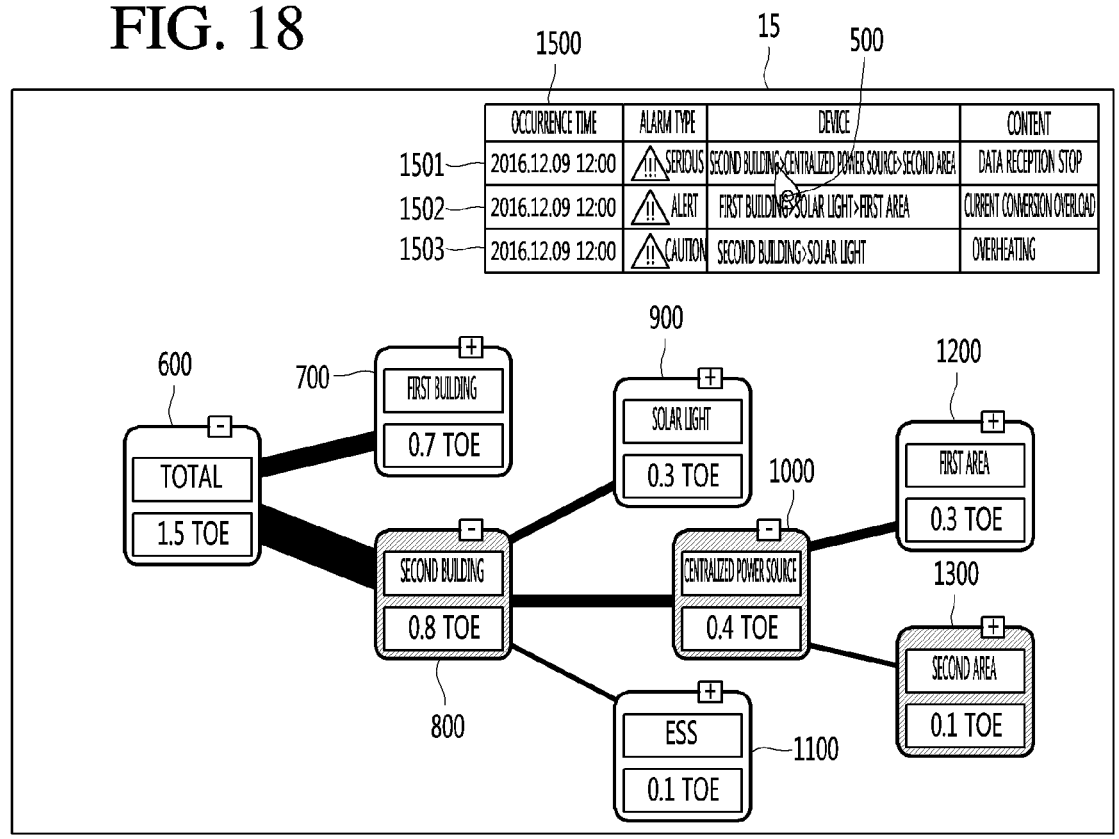
FIG. 18 is a diagram illustrating a method of displaying a problem occurrence position using an energy information icon according to a third embodiment of the present invention.

Next, FIG. 18 is a diagram illustrating a method of displaying a problem occurrence position using an energy information icon according to a third embodiment of the present invention.

The controller 17 may display at least one energy information icon similarly to the second embodiment and display at least one energy information icon 800, 1000 and 1300 indicating the direct path to the problem occurrence position from being distinguished from the other energy information icons. For example, as shown in FIG. 18, the energy information icons 800, 1000 and 1300 corresponding to the problem occurrence path may be displayed with a color different from that of the other energy information icons.

In the present invention, the direct path to the problem occurrence position means a shortest path from the highest level to the problem occurrence position.

Therefore, the user can easily grasp the problem occurrence path.

Figure 19:
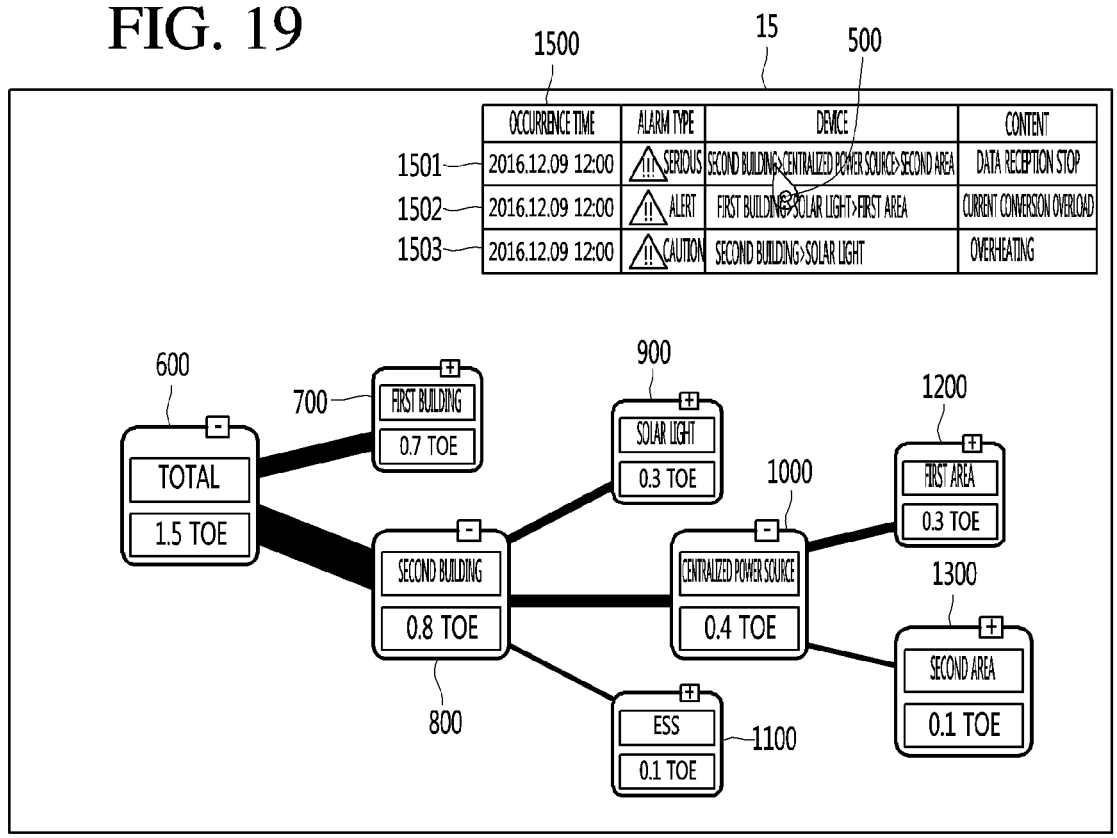
FIG. 19 is a diagram illustrating a method of displaying a problem occurrence position using an energy information icon according to a fourth embodiment of the present invention.

Next, FIG. 19 is a diagram illustrating a method of displaying a problem occurrence position using an energy information icon according to a fourth embodiment of the present invention.

The controller 17 may display the energy information icons 800, 1000 and 1300 corresponding to the problem occurrence path to be distinguished from the other energy information icons while displaying at least one energy information icon similarly to the third embodiment. For example, as shown in FIG. 19, the energy information icons 800, 1000 and 1300 corresponding to the problem occurrence path may have a greater size than the other energy information icons.

Therefore, the user can easily grasp the problem occurrence path.

The embodiments described with reference to the drawings may be implemented in combination with one or more embodiments.

While the present invention has been particularly shown and described with reference to exemplary embodiments thereof, it should be understood by those skilled in the art that the invention is not limited to the disclosed exemplary embodiments but various modifications may be made without departing from the spirit and scope of the present invention. Such modifications should not be individually understood from the technical spirit or prospect of the present invention.

The invention claimed is:

1. An energy management device comprising:
   a communication unit configured to receive energy information of a system to which the energy management device belongs;
   a controller configured to acquire energy position where energy is consumed or supplied and an amount of energy consumed or supplied at each energy position based on the received energy information; and
   a display unit configured to display at least one energy information icon based on the acquired energy position and the amount of energy; and
   the controller configured to display at least one second energy information icon corresponding to a low level of a first energy information icon when a command for selecting an expansion icon included in the first energy information icon is received and to connect the first energy information icon with the second energy information icon through an energy node,
   wherein a thickness of the energy node is displayed differently according to the amount of moved energy between a position corresponding to the first energy information icon and a position corresponding to the second energy information icon,
   wherein the controller increases the thickness of the energy node in proportion to the amount of energy corresponding to the second energy information icon, and
   wherein the controller displays the first and second energy information icons having different sizes according to the amount of energy at position corresponding to each energy information icon, and increases the sizes of the first and second energy information icons in proportion to the amounts of energy of the first and second energy information icons,
   wherein the controller further configured to:
   display a problem occurrence list indicating an energy related problem occurring in the system to which the energy management device belongs,
   when a command for selecting any one item from the problem occurrence list is received, acquire a problem occurrence position corresponding to the selected item,
   display an energy information icon of a highest level, an energy information icon corresponding to the acquired problem occurrence position and at least one energy information icon included between the highest level and the problem occurrence position, and
   connect the energy information icon of a highest level, the energy information icon corresponding to the acquired problem occurrence position and the least one energy information icon included between the highest level and the problem occurrence position with the energy node having different thickness depending on an amount of energy transfer between energy information icons.

2. The energy management device according to claim 1, wherein the controller further displays an energy information icon of the same level as the displayed at least one energy information icon.

3. The energy management device according to claim 2, wherein the controller displays the energy information icon corresponding to the problem occurrence position to be distinguished from the other energy information icons.

4. The energy management device according to claim 2, wherein the controller displays at least one energy information icon corresponding to a direct path from the highest level to the problem occurrence position to be distinguished from the other energy information icons.

5. The energy management device according to claim 1, wherein, when a command for selecting any one of the displayed at least one energy information icon is received, the controller displays change in energy data at an energy position corresponding to the selected energy information icon on a timeline with time.

6. The energy management device according to claim 5, wherein the timeline further includes change in energy data at an energy position corresponding from the selected energy information icon to an energy information icon of a predetermined low level.

7. The energy management device according to claim 5, wherein, when a command for selecting any one point in time from the timeline is received, the controller displays an energy information icon indicating the amount of energy corresponding to the selected point in time.

8. The energy management device according to claim 1, wherein the energy information icon includes an energy position item indicating a device or energy source in or to which energy is consumed or supplied and an energy amount item indicating the amount of consumed or supplied energy.

9. The energy management device according to claim 8, wherein the system is a power system for a power plant, and wherein the amount of energy is the amount of energy supplied to the system.

10. The energy management device according to claim 8, wherein the system is a power system for a place of use, and wherein the amount of energy is the amount of energy consumed in the system.

11. The energy management device according to claim 10, wherein the communication unit receives energy information from at least one energy consumption device included in the system.

12. The energy management device according to claim 1, wherein the communication unit receives energy information from an energy metering device included in the system.

* * * * *